United States Patent
White

(10) Patent No.: US 11,003,500 B2
(45) Date of Patent: May 11, 2021

(54) WORKLOAD/CONVERGED INFRASTRUCTURE ASSET ALLOCATION SYSTEM

(71) Applicant: Dell Products L.P., Round Rock, TX (US)

(72) Inventor: Alan Raymond White, Scotland (GB)

(73) Assignee: Dell Products L.P., Round Rock, TX (US)

( * ) Notice: Subject to any disclaimer, the term of this patent is extended or adjusted under 35 U.S.C. 154(b) by 154 days.

(21) Appl. No.: 16/513,205

(22) Filed: Jul. 16, 2019

(65) Prior Publication Data

US 2021/0019187 A1    Jan. 21, 2021

(51) Int. Cl.
*G06F 9/50* (2006.01)
*G06F 9/445* (2018.01)

(52) U.S. Cl.
CPC .......... *G06F 9/505* (2013.01); *G06F 9/44505* (2013.01); *G06F 9/5044* (2013.01)

(58) Field of Classification Search
CPC ..................................................... G06F 9/505
See application file for complete search history.

(56) References Cited

U.S. PATENT DOCUMENTS

2013/0332614 A1* 12/2013 Brunk ................... G06F 3/067
                                                    709/226
2015/0172117 A1*  6/2015 Dolinsky ............ H04L 41/0893
                                                    709/221

* cited by examiner

*Primary Examiner* — Charlie Sun
(74) *Attorney, Agent, or Firm* — Haynes and Boone, LLP

(57) ABSTRACT

A workload/Converged Infrastructure (CI) asset allocation system includes a CI system having a plurality of CI assets that include compute devices and storage arrays. A CI/workload management system is coupled to the CI system and receives a workload that includes workload requirements. The CI/workload management system then determines a first storage array that is included in the CI assets and that satisfies at least one storage requirement included in the workload requirements, and a first subset of the compute devices included in the CI assets that each include a path to the first storage array and that satisfy at least one compute requirement included in the workload requirements. The CI/workload management system then identifies the first subset of the compute devices, and configures the first subset of the compute devices and the first storage array to provide the workload.

20 Claims, 4 Drawing Sheets

WORKLOAD/CONVERGED INFRASTRUCTURE ASSET ALLOCATION SYSTEM

BACKGROUND

The present disclosure relates generally to information handling systems, and more particularly to allocating converged infrastructure assets in an information handling system for the provisioning of a workload.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes provided as Converged Infrastructure (CI) systems that include multiple CI assets configured in a single, optimized computing package. For example, CI assets may include compute devices such as servers, networking devices such as switches, and storage devices such as storage arrays, all of which may be integrated into a CI system with software that provides infrastructure management, automation, and orchestration. One or more workloads may then be performed via the utilization one or more of the CI assets in the CI system. However, workloads often must be performed according to different policies and service levels, while the compute devices, networking devices, and storage devices in CI systems may include different configurations and capabilities, potential physical connectivity constraints, and/or other issues that can affect the ability to use them to perform workloads. As such, the configuration of CI assets in a CI system for performing any particular workload typically requires a variety of manual processes that must be performed by a CI administrator, and thus is generally time consuming and error prone.

Accordingly, it would be desirable to provide an improved workload/CI asset allocation system.

SUMMARY

According to one embodiment, an Information Handling System (IHS) includes a processing system; and a memory system that is coupled to the processing system and that includes instructions that, when executed by the processing system, cause the processing system to provide a Converged Infrastructure (CI)/workload management engine that is configured to: receive a workload that includes a plurality of workload requirements; determine a first storage array that is included in a plurality of storage arrays and that satisfies at least one storage requirement included in the plurality of workload requirements; determine a first subset of a plurality of compute devices that include a path to the first storage array and that satisfy at least one compute requirement included in the plurality of workload requirements; identify the first subset of the plurality of compute devices; and configure the first subset of the plurality of compute devices and the first storage array to provide the workload.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
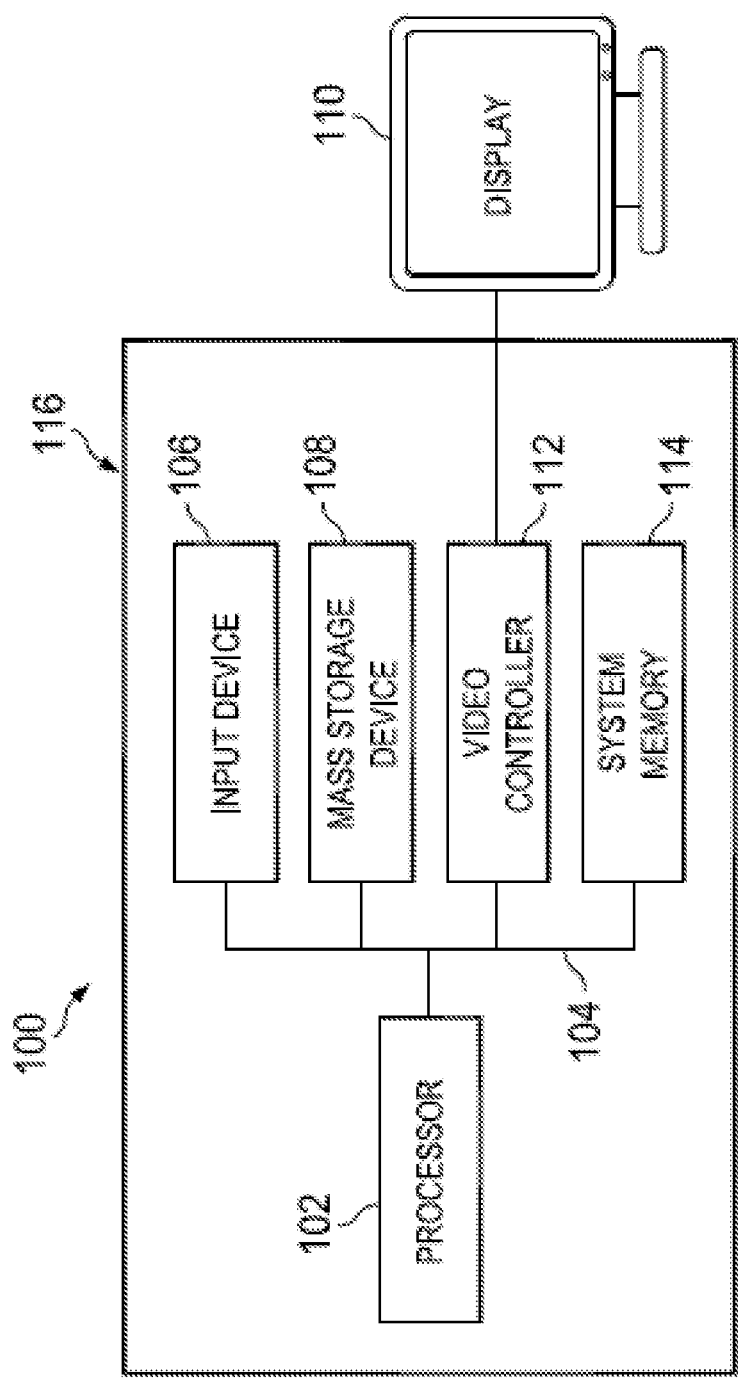
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
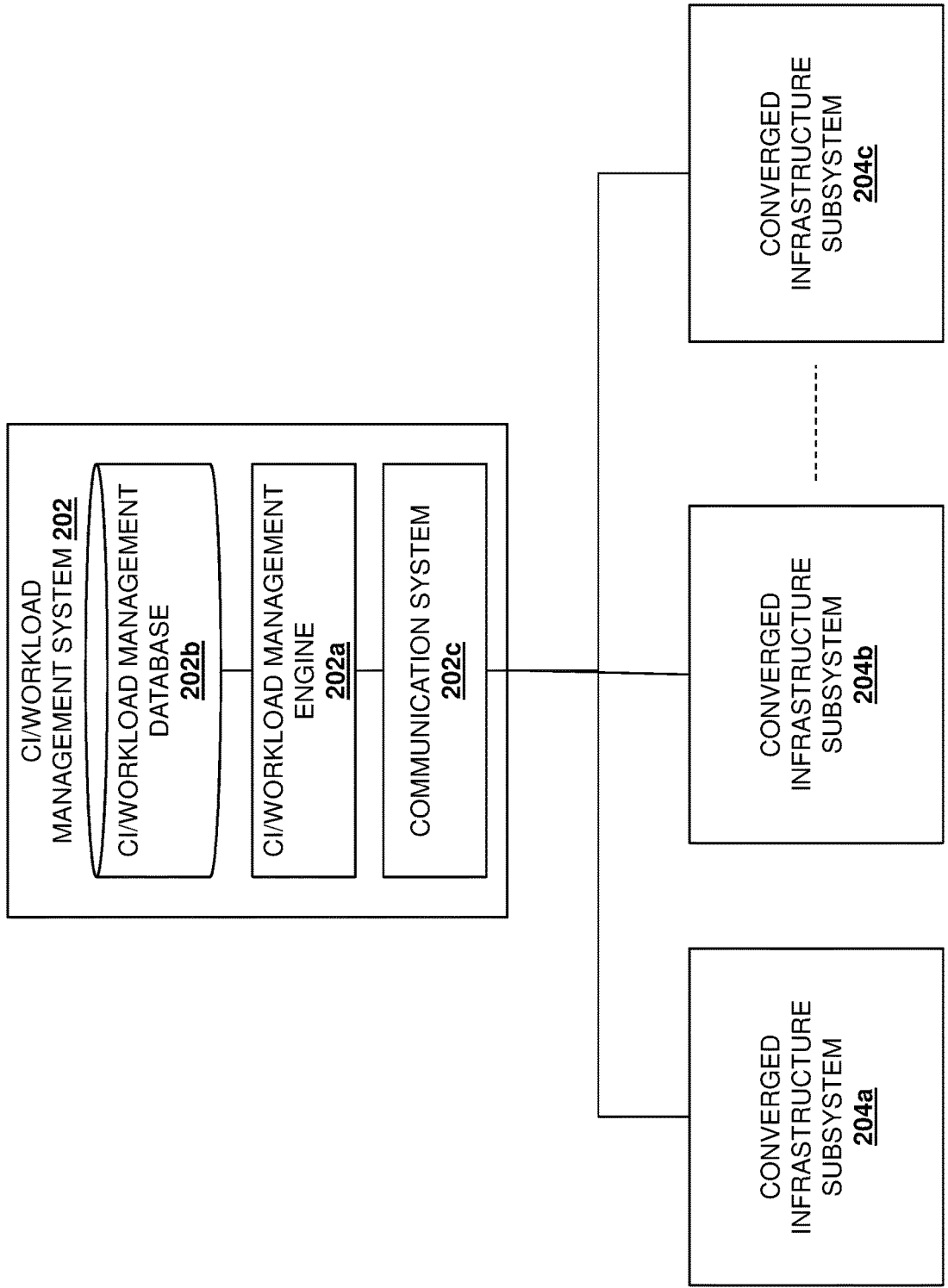
FIG. 2 is a schematic view illustrating an embodiment of a workload/converged infrastructure asset allocation system.

Referring now to FIG. 2, an embodiment of a workload/converged infrastructure asset allocation system 200 is illustrated. In the illustrated embodiment, the workload/Converged Infrastructure (CI) asset allocation system 200 includes a CI/workload management system 202. In an embodiment, the CI/workload management system 202 may be provided by the IHS 100 discussed above with reference to FIG. 1, and/or may include some or all of the components of the IHS 100. One of skill in the art in possession of the present disclosure will recognize that the CI/workload management system 202 is illustrated and discussed below as being provided by one or more server devices, but will understand that the CI/workload management system 202 provided in the workload/CI asset allocation system 200 may include any devices that may be configured to operate similarly as the CI/workload management system 202 discussed below. In the illustrated embodiment, the CI/workload management system 202 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a CI/workload management engine 202a that is configured to perform the functionality of the CI/workload management engines and/or CI/workload management systems discussed below.

In the illustrated embodiment, the CI/workload management system 202 also may include a storage system (not illustrated, but which may include the storage 108 discussed above with reference to FIG. 1) that is coupled to the CI/workload management engine 202a (e.g., via a coupling between the storage system and the processing system) and that includes a CI/workload management database 202b that is configured to store any of the information utilized by the CI/workload management engine 202a discussed below. The CI/workload management system 202 may also include a communication system 202c that is coupled to the CI/workload management engine 202a (e.g., via a coupling between the communication system 202a and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific CI/workload management system 202 has been illustrated, one of skill in the art in possession of the present disclosure will recognize that CI/workload management systems (or other devices operating according to the teachings of the present disclosure in a manner similar to that described below for the CI/workload management system 202) may include a variety of components and/or component configurations for providing conventional management functionality, as well as the functionality discussed below, while remaining within the scope of the present disclosure as well.

The workload/CI asset allocation system 200 also includes a CI system that, in the illustrated embodiment is provided by one or more CI subsystems such as the CI subsystems 204a, 204b, and up to 204c illustrated in FIG. 2. Any or all of the CI subsystems 204a-204c may be provided by the IHS 100 discussed above with reference to FIG. 1, and/or may include some or all of the components of the IHS 100. As such, any of the CI subsystems 204a-204c may include multiple CI assets that may be provided in a single, optimized computing package, and that may include compute devices such as servers (e.g., blade servers), networking devices such as switches, and storage devices provided in storage arrays (e.g., along with storage controllers), all of which may be integrated into a CI system with software that provides infrastructure management, automation, and orchestration. While only three CI subsystems 204a-204c are illustrated in FIG. 2, one of skill in the art in possession of the present disclosure will recognize that many more CI subsystems may be provided in the workload/CI asset allocation system 200 while remaining within the scope of the present disclosure. Furthermore, while not illustrated, one of skill in the art in possession of the present disclosure will understand that CI subsystems may be coupled together via one or more links while remaining within the scope of the present disclosure as well.

As will be appreciated by one of skill in the art in possession of the present disclosure, the CI subsystems 204a-204b may be provided in a variety of configurations that will fall within the scope of the present disclosure. In the examples below, each of the CI subsystems 204a-204c include a respective dedicated chassis that houses the CI assets included in that CI subsystem and, as discussed above, any of the CI subsystems 204a-204c may be coupled to other CI subsystems via links provided between those chassis. However, in other embodiments, a plurality of the CI subsystems 204a-204c discussed below may be provided in a single chassis together (with other CI subsystem(s) provided in separate chassis.) Furthermore, one of skill in the art in possession of the present disclosure will recognize that CI subsystems may be provided in one or more cabinets or racks, and those configurations will fall within the scope of the present disclosure as well. For example, each CI subsystem 204a-204c may be provided in a respective chassis that is housed in the same cabinet, or respective chassis that may be housed in different cabinets. As such, the CI subsystems 204a-204c may be distributed across cabinets and/or chassis while remaining within the scope of the present disclosure. Further still, while the CI subsystems 204a-204c are described below as including dedicated storage arrays/storage systems, shared storage arrays/storage systems may be provided in the workload/CI asset allocation system 200 for use by any of the CI subsystems 204a-204c. As such, a wide variety of CI subsystem configurations are envisioned as falling within the scope of the present disclosure. While a specific workload/CI asset allocation system 200 has been illustrated and described, one of skill in the art in possession of the present disclosure will recognize that the workload/CI asset allocation system 200 of the present disclosure may include a variety of components and component configurations while remaining within the scope of the present disclosure as well.

Figure 3:
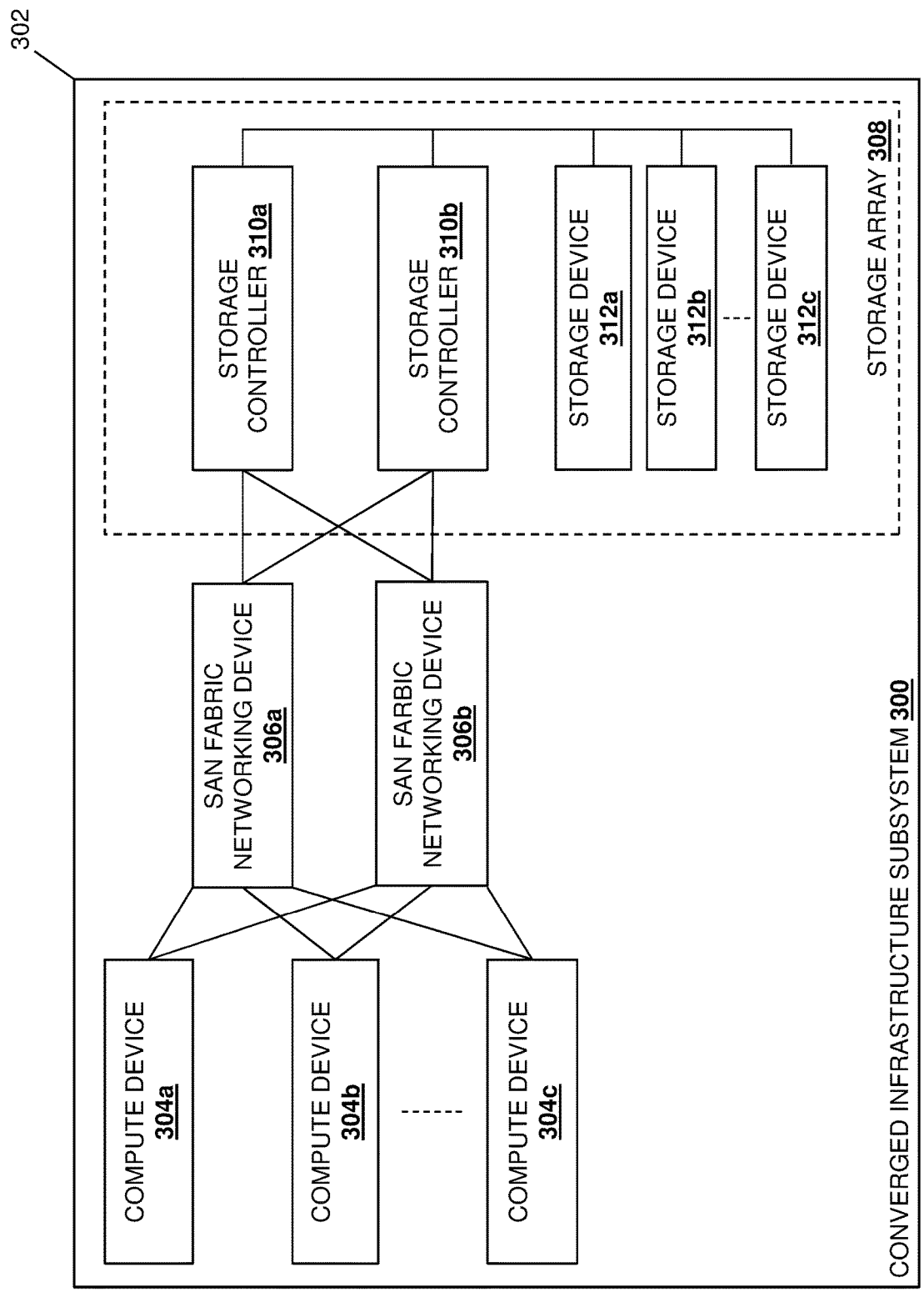
FIG. 3 is a schematic view illustrating an embodiment of a converged infrastructure subsystem that may be provided in the workload/converged infrastructure asset allocation system of FIG. 2.

Referring now to FIG. 3, an embodiment of a CI subsystem 300 is illustrated that may provide any or all of the CI subsystems 204a-204c discussed above with reference to FIG. 2. As such, the CI subsystem 300 may be provided by the IHS 100 discussed above with reference to FIG. 1 and/or may include some or all of the components of the IHS 100, and in specific examples may include multiple CI assets that may be provided in a single, optimized computing package, and that may include compute devices such as servers, networking devices such as switches, and storage devices such as storage arrays, all of which may be integrated into a CI system with software that provides infrastructure management, automation, and orchestration. Furthermore, while illustrated and discussed as a CI subsystem 300, one of skill in the art in possession of the present disclosure will recognize that the functionality of the CI subsystem 300 discussed below may be provided by other devices that are configured to operate similarly as the CI subsystem 300 discussed below.

In the illustrated embodiment, the CI subsystem 300 includes a chassis 302 that houses the components of the CI subsystem 300, only some of which are illustrated below. The CI subsystem 300 is illustrated as including a dedicated chassis 302 that houses the CI assets included in the CI subsystem 302, as well as optionally being coupled to other CI subsystems (e.g., via links provided between CI subsystem chassis.) However, in other embodiments, a plurality of the CI subsystems that are substantially similar to the CI subsystem 300 discussed below may be provided in a single chassis together (e.g., with other CI subsystem(s) provided in separate chassis.) Furthermore, one of skill in the art in possession of the present disclosure will recognize that the CI subsystem 300 may be provided in a cabinet, with CI subsystems that are substantially similar to the CI subsystem 300 distributed across one or more cabinets or racks. As such, the CI subsystem 300 may be provided in the chassis 302 that is housed in a cabinet with other CI subsystems provided in their respective chassis housed in that cabinet as well, and/or with other CI subsystems provided in their respective chassis housed in different cabinets. As such, the CI subsystem 300 (and other CI subsystems) may be distributed across cabinets and/or chassis while remaining within the scope of the present disclosure. Further still, while the CI subsystem 300 is illustrated and described as including a dedicated storage array/storage system, shared storage arrays/storage systems may be provided in the workload/CI asset allocation system 200 for use by any of the CI assets in the CI subsystem 300. As such, a wide variety of CI subsystem configurations are envisioned as falling within the scope of the present disclosure.

In the illustrated embodiment, the chassis 302 houses a plurality of compute devices 304a, 304b, and up to 304c. Any or all of the compute devices 304a-304c may be provided by the IHS 100 discussed above with reference to FIG. 1, and/or may include some or all of the components of the IHS 100, and in specific examples, may be provided by blade servers. However, while described as server devices, one of skill in the art in possession of the present disclosure will recognize that the compute devices 304a-304c may be provided by a variety of devices that are configured to operate similarly as the compute devices 304a-304c discussed below. While not illustrated, one of skill in the art in possession of the present disclosure will recognize that any or all of the compute devices 304a-304c may be coupled to networking devices such as, for example, Ethernet switch devices, that are provided outside of the chassis 302 and coupled to the compute devices using a variety of conventional compute/networking device coupling techniques known in the art.

In the illustrated embodiment, the chassis 302 also houses a plurality of Storage Area Network (SAN) fabric networking devices 304a and 306b, each of which is coupled to each of the compute devices 304a-304c. Either or both of the SAN fabric networking devices 306a and 306b may be provided by the IHS 100 discussed above with reference to FIG. 1, and/or may include some or all of the components of the IHS 100, and in specific examples may be provided by switch devices. However, while described as switch devices, one of skill in the art in possession of the present disclosure will recognize that the SAN fabric networking devices 306a and 306b may be provided by a variety of devices that are configured to operate similarly as the SAN fabric networking devices 306a and 306b discussed below.

In the illustrated embodiment, the chassis 302 also houses a storage array 308 that includes a plurality of storage controllers 310a and 310b, along with a plurality of storage devices 312a, 312b, and up to 312c, with each of the storage devices 312a-312c coupled to each of the storage controllers 310a and 310b. Furthermore, each of the storage controllers 310a and 310b in the storage array 308 is coupled to each of the SAN fabric networking devices 306a and 306b. As will be appreciated by one of skill in the art in possession of the present disclosure, storage arrays provided in the CI subsystem 300 may include any of a variety of storage controllers and storage devices known in the art, as well as any other storage array components that may be utilized to provide the storage array functionality discussed below. However, while a specific CI subsystem 300 has been illustrated, one of skill in the art in possession of the present disclosure will recognize that CI subsystems (or other devices operating according to the teachings of the present disclosure in a manner similar to that described below for the CI subsystem 300) may include a variety of components and/or component configurations for providing conventional CI system functionality, as well as the functionality discussed below, while remaining within the scope of the present disclosure as well.

In a some of the examples discussed below, the CI subsystem 300 that provides the CI system (and/or other CI subsystems 204a, 204b, and/or 204c that provide a CI system) include CI assets (e.g., the compute devices 304a-304c, the SAN fabric networking devices 306a and 306b, and the storage array 308 with storage controllers 310a and 310b and storage devices 312a-312c) that have been engineered, configured, and/or otherwise provided as an integrated CI system that includes defined boundaries and capabilities such that it may be considered a "bounded system". For example, the compute devices 304a-304c (e.g., provided by server devices) may be provided in the CI subsystem(s)/CI system in units of consumption often referred to as clusters (e.g., server clusters) that are configured to share the same storage array/storage devices in providing workloads in order to provide failover, redundancy, and/or other functionality known in the art. As such, software such as the VMWARE® VSPHERE® production cluster provided by VMWARE® Inc. of Palo Alto, Calif., United States may be utilized with the CI subsystem(s)/CI system to perform general purpose workloads, and may be incorporated with the CI subsystem(s)/CI system according to "best practices" configuration techniques defined by the CI subsystem(s)/CI system provider and/or the provider of the software used to provide workloads on the cluster via the bounded CI system. As will be appreciated by one of skill in the art in possession of the present disclosure, in some embodiments, the provisioning of CI subsystem(s)/CI systems/software in such a manner may allow for simplified cluster determinations and configurations like those discussed below, as well as the automated CI system/workload allocations described herein. However, while particular cluster configuration software provided in a bounded CI system is described, one of skill in the art in possession of the present disclosure will recognize that other cluster configuration software (e.g., cluster configuration software for MICROSOFT® clusters provided by MICROSOFT® Corporation of Redmond, Wash., United States) on other CI systems will fall within the scope of the present disclosure as well.

In a specific example, with reference to FIGS. 2 and 3, the provisioning of the CI system/CI subsystem as a bounded system includes providing the CI/workload management database 202b in the CI/workload management system 202 with an inventory of any CI assets in the CI system provided by the CI subsystem(s) 204a-204c, with the ability to indicates CI asset types and CI asset quantities, as well as their level of utilization (e.g., for use in the CI asset allocation operations discussed below.) Furthermore, the inventory in the CI/workload management database 202b may also indicate CI asset connectivity capabilities such as, for example, whether a path exists between any of the compute device(s) 304a-304c and particular storage devices 312a-312c in the storage array 308. Further still, the provisioning of the CI system/CI subsystem as a bounded CI system may ensure that there are no network fabric constraints (e.g., constraints in the network fabric provided by the Ethernet switch devices that are located outside of the chassis 302 and coupled to the compute devices 304a-304c, discussed above) inherent in the design of the CI subsystem(s)/CI system that will impact the ability to use any of the compute devices 304a-304c with network configurations such as VLANs (and their associated routing operations.)

The CI subsystem 300 illustrates an example of a bounded system in that the storage array 308 is connected to the compute devices 304a-304c via 2 independent SAN fabric networking devices 306a and 306b, and one of skill in the art in possession of the present disclosure will recognize that all of the storage devices 312a-312c in the storage array 308 may be presented by each of the storage controllers 310a and 310b (e.g., across the SAN ports provided by those storage controllers 310a and 310b.) As such, each storage array 308 provided in a CI subsystem may include pairs of storage controllers (e.g., the storage controllers 310a and 310b) that are each connected to both SAN fabric networking devices 306a and 306b, with each of the compute devices 304a-304c presented on the storage controller pair (or port groups provided by that storage controller pair.) However, while a particular bounded CI system/CI subsystem has been described, one of skill in the art in possession of the present disclosure will recognize that different CI systems/CI subsystems will fall within the scope of the present disclosure as well. For example, architectures with more than the pair of SAN fabric networking devices illustrated in FIG. 3 (e.g., two pairs of SAN fabric networking devices) may be utilized with relatively high bandwidth compute devices, more connections may be provided between high bandwidth compute devices and the SAN fabric networking devices 306a and 306b, and/or a variety of other configuration modifications may be introduced to the embodiment illustrated in FIG. 3 while remaining within the scope of the present disclosure as well.

Figure 4:
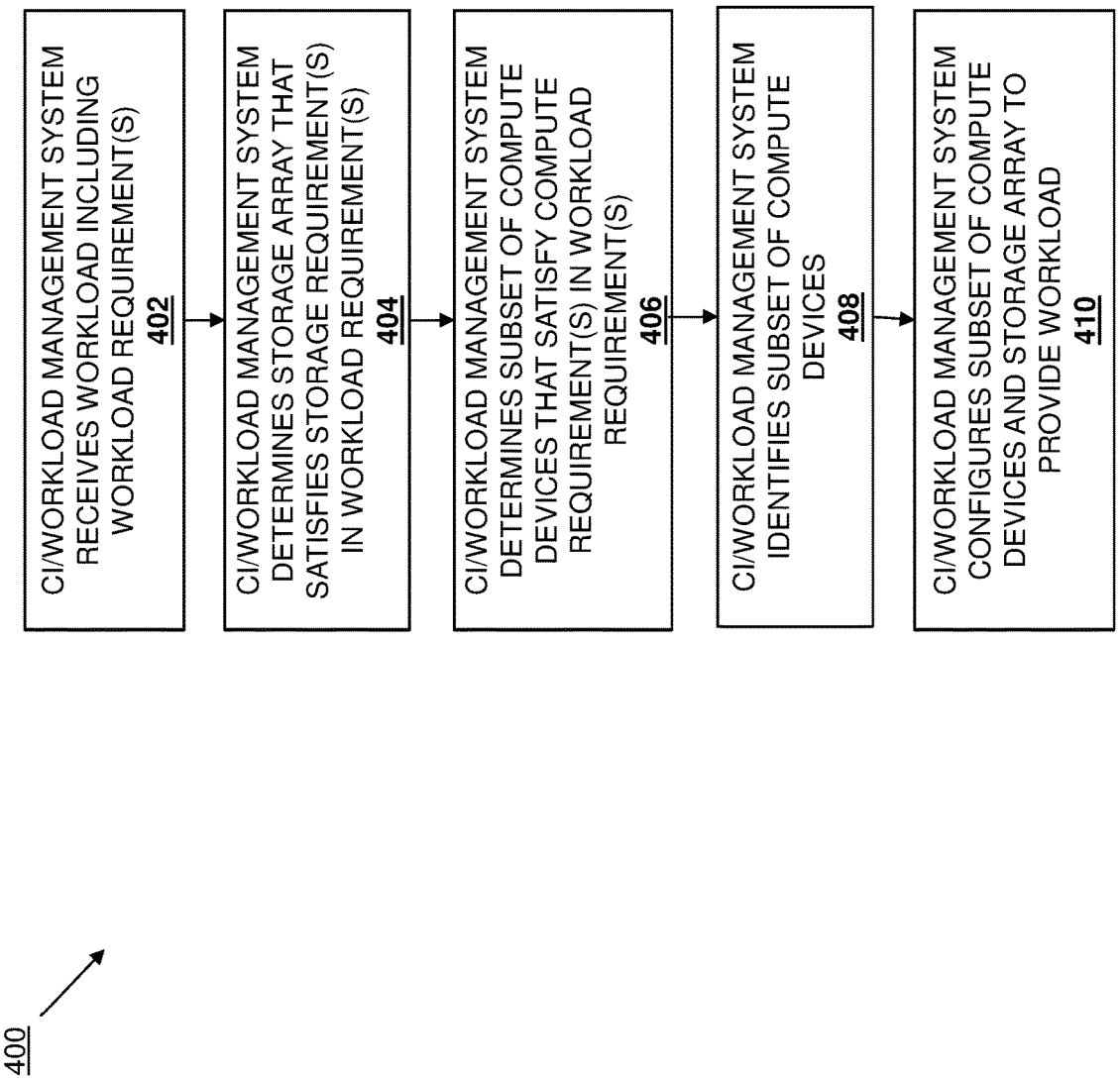
FIG. 4 is a flow chart illustrating an embodiment of a method for allocating converged infrastructure asset to workloads.

Referring now to FIG. 4, an embodiment of a method 400 for allocating converged infrastructure asset to workloads is illustrated. As discussed below, embodiments of the systems and methods of the present disclosure provide for the identification of workload performance and capacity requirements for a workload, followed by the automatic determination of CI assets (in a bounded CI system that has been configured with best policy practices) that satisfy the workload performance and capacity requirements, which allows that workload to subsequently be performed using those CI assets. This may be accomplished by a CI/workload management system that receives a workload including workload requirements, determines a first storage array that is included in a plurality of storage arrays provided in a CI system and that satisfies at least one storage requirement included in the workload requirements, and determines a first subset of a plurality of compute devices included in the CI system and that have a path to the first storage array and that satisfy at least one compute requirement included in the workload requirements. The CI/workload management system may then identify the first subset of the compute devices to a user of the CI system, and configure the first subset of the compute devices and the first storage array to provide the workload. As such, an automated configuration of CI assets in a CI system for performing any particular workload is provided that eliminates the need to perform time consuming and error prone manual processes required for conventional CI systems. While a specific order of operations/blocks for the method 400 are described below, one of skill in the art in possession of the present disclosure will recognize that the order of operations/blocks described below may be modified based on the details of the system being configured (e.g., CI assets may be identified in different orders, in parallel, and/or in any other manner that would be apparent to one of skill in the art in possession of the present disclosure.)

The method 400 begins at block 402 where a CI/workload management system receives a workload including workload requirement(s). In an embodiment, at block 402, the CI/workload management engine 202a may receive a workload that includes a plurality of workload requirements. For example, a user of the CI system provided by the CI subsystems 204a-204c may transmit, identify, and/or otherwise provide a workload to the CI/workload management engine 202a (e.g., via the communication system 202c, an input device, and/or in a variety of other manners that would be apparent to one of skill in the art in possession of the present disclosure.)

In an embodiment, the plurality of workload requirements included with the workload received at block 402 may include CI asset hardware requirements. For example, CI asset hardware requirements for the workload may include compute hardware requirements such as a total processing capacity requirement (e.g., a total amount of Central Processing Unit (CPU) processing power (e.g., expressed in GHz) that the compute devices performing the workload must provide), a processing core requirement (e.g., a minimum number of CPU cores that the compute devices performing the workload must provide), a total memory capacity requirement (e.g., a total amount of Random Access Memory (RAM) (e.g., expressed in GB) that the compute devices performing the workload must provide), a processing type requirement (e.g., a type of processing system (e.g., a Field Programmable Gate Array (FPGA), a Graphics Processing Unit (GPU), etc.) that the compute devices performing the workload must provide), and/or other compute hardware requirements that would be apparent to one of skill in the art in possession of the present disclosure. In another example, CI asset hardware requirements for the workload may include storage hardware requirements such as a total storage capacity requirement (e.g., a total amount of storage (e.g., expressed in GB) that the storage devices performing the workload must provide) and/or other storage hardware requirements that would be apparent to one of skill in the art in possession of the present disclosure.

In an embodiment, the plurality of workload requirements included with the workload received at block 402 may include CI asset attribute requirements. For example, CI asset attribute requirements for the workload may include storage attribute requirements such as a compression attribute requirement (e.g., the workload may require that storage devices utilized in its provision be capable of compressing data stored thereon), a de-duplication attribute requirement (e.g., the workload may require that storage devices utilized in its provision be capable of de-duplicating data stored thereon), an encryption attribute requirement (e.g., the workload may require that storage devices utilized in its provision be capable of encrypting data stored thereon), and/or other storage attribute requirements that would be apparent to one of skill in the art in possession of the present disclosure. Furthermore, other workload requirements for the workload may include service level objective requirements that identify a service level that should be provided for the workload (e.g., identified by a service level policy name such as, for example, a "gold" service level, a "silver" service level, a "bronze" service level, etc.) However, while a few specific examples have been described, one of skill in the art in possession of the present disclosure will recognize that workloads may include any of a variety of workload requirements that will fall within the scope of the present disclosure as well.

In addition to workload requirements for the workload, optional CI system requirements may be identified at block 402. For example, one or more CI system policies may be stored in the CI/workload management database 202b, and at block 402 the CI/workload management engine 202a may retrieve or otherwise identify the CI system polic(ies). In some embodiments, a CI system policy may include a chassis distribution policy that defines the number of different chassis that should be used when allocating CI assets for performing workloads. For example, chassis distribution policies may provide for the use of compute devices in as many different chassis and/or cabinets as possible (e.g., in order to provide redundancy). In another example, chassis distribution policies may provide for the use of compute devices in as few chassis and/or cabinets as possible (e.g., in order to provide security). In another example, chassis distribution policies may provide for the use of compute devices in a defined number of chassis and/or cabinets (e.g., compute devices in a single chassis, which may override best practices requirements). In general, default chassis distribution policies will follow best practices that attempt to provide redundancy by using compute devices in as many different chassis and cabinets as possible, although one of skill in the art in possession of the present disclosure will recognize that a variety of different kinds of chassis distribution policies will fall within the scope of the present disclosure as well.

In some embodiments, a CI system policy may include a storage path policy that defines the number of storage controllers in a storage array over which a cluster of compute devices may perform Input/Output (I/O) operations with its storage devices (e.g., to define a storage array bandwidth provided between compute devices and storage devices.) Furthermore, other CI system policies may identify a minimum number of compute devices per cluster, a minimum compute device bandwidth to an external network (e.g., via Ethernet switch devices coupled to those compute devices), workload profile weighting policies that allow workloads to prefer compute devices with relatively high processor core counts or relatively high clock speeds, and/or any other CI system policies that would be apparent to one of skill in the art in possession of the present disclosure.

The method 400 then proceeds to block 404 where the CI/workload management system determines a storage array that satisfies storage requirement(s) included in the workload requirement(s). In an embodiment, at block 404, the CI/workload management engine 202a in the CI/workload management system 202 operates to identify a storage array that satisfies the storage requirement(s) included in the workload requirement(s) for the workload. For example, at block 404, the CI/workload management engine 202a may first identify storage arrays in the CI subsystems 204a-204c/300 that satisfy CI asset hardware requirements for the workload and CI asset attribute requirements for the workload. As such, the storage arrays identified at block 404 may include storage arrays that satisfy the total storage capacity requirement for the workload, the compression attribute requirement for the workload, the de-duplication attribute requirement for the workload, the encryption attribute requirement for the workload, the service level objective requirement for the workload, and/or any other workload requirement, CI system requirement, or CI system policy that would be apparent to one of skill in the art in possession of the present disclosure.

In an embodiment, for each of the storage arrays identified at block 404, the CI/workload management engine 202a may determine the utilization of the storage controllers in each of those storage arrays, and then prioritize storage controllers with relatively lower utilization over storage controllers with relatively high utilization. For example, at block 404, the CI/workload management engine 202a may prioritize storage controllers associated with the fewest compute devices that are currently configured to use them. However, in another example, at block 404 the CI/workload management engine 202a may retrieve telemetry data for the storage controllers to determine an amount of data being transmitted by those storage controllers between the compute devices and their storage devices. As such, following block 404, the CI/workload management engine 202a will have identified storage arrays in the CI subsystems 204a-204c that satisfy CI asset hardware requirements for the workload and CI asset attribute requirements for the workload, with those storage arrays prioritized by their storage controller utilization. However, while a specific process for identifying a storage array has been described, one of skill in the art in possession of the present disclosure will recognize that storage arrays may be identified in a variety of manners that will fall within the scope of the present disclosure as well.

The method 400 then proceeds to block 406 where the CI/workload management system determines a subset of compute devices that satisfy compute requirement(s) in the workload requirement(s). In an embodiment, at block 406, the CI/workload management engine 202a in the CI/workload management system 202 operates to identify a subset of compute devices that satisfies the compute requirement(s) included in the workload requirement(s) for the workload. For example, at block 404, the CI/workload management engine 202a may first identify compute devices in the CI subsystems 204a-204c/300 that each include a path to the storage devices in the storage arrays identified at block 404 and, for those identified compute devices, may determine a subset of those compute devices that satisfy CI asset hardware requirements for the workload. As such, the subset of compute devices identified at block 406 may include compute devices that satisfy the total processing capacity requirement for the workload, the processing core requirement for the workload, the total memory capacity requirement for the workload, the processing type requirement for the workload, and/or other compute hardware requirements that would be apparent to one of skill in the art in possession of the present disclosure.

In some examples, subset of compute devices identified at block 404 may be grouped by the CI/workload management engine 202a by compute domains. As would be understood by one of skill in the art in possession of the present disclosure, compute domains may include collections of compute devices (e.g., server devices) that share common network paths (e.g., via their connected Ethernet switch devices, discussed above), and the grouping of the subset of compute devices by compute domains may ensure that a cluster of compute devices is provided within a single compute domain. Furthermore, in some examples, the subset of compute devices determined by the CI/workload management engine 202a may be the minimum number of compute devices needed to satisfy the CI asset hardware requirements for the workload. Further still, in some examples, the CI/workload management engine 202a may determine compute devices for inclusion into the subset of compute devices identified at block 406 based on those compute devices being "balanced" across different chassis or cabinets (e.g., as per the chassis distribution policies discussed above). For example, such balancing of computing devices may attempt to ensure a +/−1 variance in count between chassis or cabinets. However, while a specific process for identifying a subset of compute devices has been described, one of skill in the art in possession of the present disclosure will recognize that the subset of compute devices may be identified in a variety of manners that will fall within the scope of the present disclosure as well.

As discussed below, the result of blocks 402, 404, and 406 may include the output of a CI asset pool list that provides a list of suitable CI assets in the CI system for providing/performing the workload. As such, the CI asset pool list may identify one or more compute device/storage array combinations that have been determined to be suitable for providing/performing the workload, and when multiple compute device/storage array combinations are identified, they may be prioritized to identify which of the compute device/storage array combinations best satisfy the workload requirements and/or CI system requirements/policies. For example, a CI asset pool list may include a CI asset pool index identifying each compute device/storage array combination (e.g., a $1^{st}$ compute device/storage array combination, and $2^{nd}$ compute device/storage array combination, etc.), a preference factor for each compute device/storage array combination that may indicate a level of prioritization of that compute device/storage array combination, a storage array reference that may identify the storage array in that compute device/storage array combination, a storage controller identification that may identify the storage controllers included in the storage array in that compute device/storage array combination, a compute device type identification that may identify details about the compute devices (e.g., number of processors, processor models, processor clocks speeds, memory available, etc.) in that compute device/storage array combination, an identification of compute devices selected for that compute device/storage array combination, and/or any other CI asset information that would be apparent to one of skill in the art in possession of the present disclosure. As discussed below, a compute device/storage array combination may then be identified in the CI asset pool list for use in creating an Application Programming Interface (API) call (e.g., compute device cluster "create API call") that identifies a discrete list of the CI assets that will be used to provide/perform the workload.

In a specific example, one of the mechanisms for ranking and/or prioritizing compute device/storage device combinations involves understanding what the over-allocation of CI asset resources would be, and weighting wastage/over-allocation as a factor in deciding which compute device/storage device combination is the "least worst" choice for performing the workload. For example, each compute device includes a physical configuration of hardware resources in terms of number of sockets, cores, and memory, and simply multiplying the number of compute devices in order to meet the workload capacity requirements may result in an over-allocation of sockets, memory, and/or other CI asset resources. As such, policy-based factors may be provided to allow the user to direct the behavior of the method 400 to prefer reduced CPU wastage over reduced memory wastage, or vice versa, by weighting one subset of resources over another. Over-allocation/wastage issues may become less significant when next generation composable compute technology becomes available and the boundaries of an individual compute module become elastic, as resources for composable compute technology may allow a user may mold the CI asset boundaries to create a best fit (e.g., the CI assets discussed above may have fixed hardware attributes, while composable CI assets may allow for their granular configuration to provide any amount of hardware asset resources as desired by the user.) One of skill in the art in possession of the present disclosure will recognize how the teachings of the present disclosure may be modified to utilize the composable compute technology discussed above to allocate composable computer/storage array resources to a workload while remaining within the scope of the present disclosure as well.

However, in some embodiments, blocks 404 and 406 may fail to identify a compute device/storage array combination that satisfies the workload requirements, CI system requirements, and/or CI system policies. For example, the CI/workload management engine 202a may generate a CI asset pool list failure (or a CI asset pool list with no compute device/storage array combinations) in the event CI asset hardware requirements and/or CI asset attribute requirements in the workload requirements for the workload cannot be satisfied by any combination of CI assets in the CI system. In some specific examples, the CI asset list failure may identify that the CI asset attribute requirements for the workload requested compression-capable storage devices and no storage array in the CI system includes storage devices with compression capability, that the CI asset attribute requirements for the workload requested de-duplication-capable storage devices and no storage array in the CI system includes storage devices with de-duplication capability, that the CI asset attribute requirements for the workload requested encryption-capable storage devices and no storage array in the CI system includes storage devices with de-duplication capability. In other specific examples, the CI asset list failure may identify that a service level requested for the workload cannot be provided by any combination of CI assets in the CI system.

In other specific examples, the CI asset list failure may identify that the CI asset hardware requirements for the workload requested a minimum storage capacity and no storage array in the CI system includes storage devices that can provide that minimum storage capacity, that the CI asset hardware requirements for the workload requested a minimum storage controller bandwidth and no storage array in the CI system includes storage controllers that can provide that minimum storage controller bandwidth, that the CI asset hardware requirements for the workload requested minimum compute device capabilities (e.g., minimum processing and/or memory capabilities) and no compute devices in the CI system can provide that minimum compute device capability. In other specific examples, the CI asset list failure may identify that while a suitable storage array was identified, no compute devices with access to those storage arrays were identified as available, and/or that an insufficient number of compute devices within the same compute domain and with access to those storage arrays were identified as available.

The method 400 then proceeds to block 408 where the CI/workload management system identifies the subset of compute devices. In an embodiment, at block 408, the CI asset pool list discussed above may be generated with at least one compute device/storage array combination, and the CI/workload management engine 202a may identify the subsets of compute devices in those compute device/storage array combination(s). In some examples, the identification of the subsets of compute devices in the compute device/storage array combination(s) at block 408 may include providing the subsets of compute devices for display to a user (e.g., via a display device on the CI/workload management system 202). As such, in some embodiments, a user may select a compute device/storage array combination from the CI asset pool list in order to provide an instruction to provide the workload on that compute device/storage array combination. In other examples, the identification of the subsets of compute devices in the compute device/storage array combination(s) at block 408 may include the CI/workload management engine 202a automatically selecting the highest priority compute device/storage array combination in the CI asset pool list. As such, in some embodiments, the generation of the CI asset pool list may include the automatic selection of the highest priority compute device/storage array combination from the CI asset pool list for use in performing the workload. While a few examples have been provided, one of skill in the art in possession of the present disclosure will recognize that the compute device/storage array combination for use in performing the workload may be selected in a variety of manners that will fall within the scope of the present disclosure as well.

The method 400 then proceeds to block 410 where the CI/workload management system configures the subset of compute devices and the storage array to provide the workload. In an embodiment, at block 410, the CI/workload management engine 202a may operate to configure the storage array identified at block 404 and the subset of compute devices identified at block 406 to provide the workload received at block 402. As will be appreciated by one of skill in the art in possession of the present disclosure, the configuration of compute devices and storage arrays to perform a workload may be performed in a variety of manners known in the art, and thus is not discussed in detail here. As such, following block 410, the storage array identified at block 404 and the subset of compute devices identified at block 406 may operate to perform the workload received at block 402.

A specific example will now be provided to illustrate how the method 400 may operate to identify storage arrays that satisfy the workload requirements of a workload, identify the types and quantities of available compute devices for use in providing the workload, and then return a CI asset pool list with the most appropriate compute devices and storage arrays for providing the workload. Following the identification of a workload at block 402, the CI/workload management engine 202a may identify storage arrays that meet workload requirements of the workload, and prioritize a CI asset pool list with those storage arrays such that storage arrays handling the fewest compute device clusters are prioritized highest in the CI asset pool list. Each storage array in the CI asset pool list may initially be associated with a preference factor of 1000. In the event the workload requires storage devices capable of compression, the CI/workload management engine 202a may remove any storage arrays that do not include storage devices capable of compression from the CI asset pool list. In the event the removal of the storage arrays that do not include storage devices capable of compression from the CI asset pool list results in the CI asset pool list including no storage arrays, the CI/workload management engine 202a may provide a CI asset list failure message to the user of the CI system that identifies the lack of storage arrays providing compression as required by the workload.

In the event the workload requires storage devices capable of de-duplication, the CI/workload management engine 202a may remove any storage arrays that do not include storage devices capable of de-duplication from the CI asset pool list. In the event the removal of the storage arrays that do not include storage devices capable of de-duplication from the CI asset pool list results in the CI asset pool list including no storage arrays, the CI/workload management engine 202a may provide a CI asset list failure message to the user of the CI system that identifies the lack of storage arrays providing de-duplication as required by the workload. In the event the workload requires storage devices capable of encryption, the CI/workload management engine 202a may remove any storage arrays that do not include storage devices capable of encryption from the CI asset pool list. In the event the removal of the storage arrays that do not include storage devices capable of encryption from the CI asset pool list results in the CI asset pool list including no storage arrays, the CI/workload management engine 202a may provide a CI asset list failure message to the user of the CI system that identifies the lack of storage arrays providing encryption as required by the workload.

In the event the workload requires a particular storage array service level objective, the CI/workload management engine 202a may remove any storage arrays that are not capable of meeting the particular storage array service level objective from the CI asset pool list. In the event the removal of the storage arrays that are not capable of meeting the particular storage array service level objective from the CI asset pool list results in the CI asset pool list including no storage arrays, the CI/workload management engine 202a may provide a CI asset list failure message to the user of the CI system that identifies the lack of storage arrays capable of meeting the particular storage array service level objective required by the workload. In the event the workload requires a minimum storage capacity, the CI/workload management engine 202a may remove any storage arrays that do not include available storage devices providing the minimum storage capacity from the CI asset pool list. In the event the removal of the storage arrays that do not include available storage devices providing the minimum storage capacity from the CI asset pool list results in the CI asset pool list including no storage arrays, the CI/workload management engine 202a may provide a CI asset list failure message to the user of the CI system that identifies the lack of storage arrays that include available storage devices providing the minimum storage capacity required by the workload.

The CI/workload management engine 202a may then determine a number of storage controller pairs for each storage array in the CI asset pool list, and add entries for each storage controller pair to the CI asset pool list (in association with its respective storage array.) The CI/workload management engine 202a may then determine a number of compute devices in each compute device cluster utilizing the storage controller pair(s) in each storage array that is identified in the CI asset pool list and, in the event a storage controller pair in a storage array is utilized by a maximum number of compute devices (as defined by the workload requirements), the storage array associated with that storage controller pair may be removed from the CI asset pool list. In the event the removal of the storage arrays that are utilized by the maximum number of compute devices from the CI asset pool list results in the CI asset pool list including no storage arrays, the CI/workload management engine 202a may provide a CI asset list failure message to the user of the CI system that identifies the lack of storage arrays that are utilized by less than the maximum number of compute devices required by the workload. For the storage arrays that are utilized by less than the maximum number of compute devices required by the workload, the number of compute devices in the compute device cluster(s) that utilize their storage controller pair may be subtracted from the preference factor associated with that storage array.

The CI/workload management engine 202a may then operate to identify compute devices that meet the workload requirements for the workload. In the event there are no compute devices that meet the workload requirements, the CI/workload management engine 202a may provide a CI asset list failure message to the user of the CI system that identifies the lack of compute devices that satisfy the workload requirements for the workload. When compute devices are identified that meet the workload requirements for the workload, the CI/workload management engine 202a may determine, for each storage array included in the CI asset pool list, compute devices that are not currently providing workloads and that have a path to that storage array, with those compute devices grouped by compute device type (which provides for the selection of compute devices with identical configurations for any resulting compute device cluster). Uniqueness of compute device types may be defined by number of compute device processors, processor models, processor clock speeds, and processor memory capacity. Furthermore, additional compute device filtering criteria may be applied, including whether the compute device is GPU capable or not. The CI/workload management engine 202a may then create an entry in the CI asset pool list for any storage array that is associated with identified compute devices, which will provide each storage array entry in the CI asset pool list with a list of identical compute device types. In the event no unused compute devices are associated with a storage array, that storage array may be removed from the CI asset pool list. As will be appreciated by one of skill in the art in possession of the present disclosure, the same list of compute devices may be associated with multiple storage arrays in the CI asset pool list. In the event no compute devices are associated with any of the storage arrays in the CI asset pool list, the CI/workload management engine 202a may provide a CI asset list failure message to the user of the CI system that identifies the lack of compute devices for providing the workload.

As will be appreciated by one of skill in the art in possession of the present disclosure, compute devices may be managed from a central point that creates a domain of compute device resources, and best practices often prevent a compute device cluster from being spread across multiple compute domains. In an embodiment, the CI/workload management engine 202a may identify subsets of compute devices associated with each storage array in the CI asset pool list that are part of the same compute domain, which may result in an expanded CI asset pool list if multiple compute domains are associated with the compute devices utilizing a storage array in the CI asset pool list, as a new entry may be created for each compute domain.

The CI/workload management engine 202a may then examine each entry in the CI asset pool list to determine the minimum number of compute devices required to provide the minimum processing system capacity identified in the workload requirements for the workload, and if an entry in the CI asset pool list does not include that minimum processing capacity, it may be removed from the CI asset pool list. In the event the CI asset pool list is empty following this step, the CI/workload management engine 202a may provide a CI asset list failure message to the user of the CI system that identifies the lack of compute devices processing capability for providing the workload.

One of skill in the art in possession of the present disclosure will recognize that best practices may call for ensuring the compute devices in a cluster are balanced across chassis or cabinets in order to provide redundancy and ensure availability. As such, the CI/workload management engine 202a may sort the CI asset pool list based on the minimum compute device determination discussed above in order to prioritize the entries with the lowest number of compute devices, and for each entry, the compute devices may be examined to determine in which chassis and/or cabinet they are housed. A compute device may then be identified in each chassis and/or cabinet until the minimum compute device number is met. In the event all the identified compute devices are in the same chassis and/or cabinet, the associated entry in the CI asset pool list may have 500 subtracted from its preference factor. However, while particular preference factor values are provided herein, one of skill in the art in possession of the present disclosure will recognize that those preference factor values are merely examples, and that the preference factor associated with an entry in the CI asset pool list may be 'down weighted' by any amount that may be determined by any of a variety of specific policy considerations). In the event the variance between the number of identified compute devices is greater than 1, an imbalance of compute device is identified and the associated entry in the CI asset pool list may have 300 subtracted from its preference factor. The CI asset pool list may then be sorted such that the entries with the high preference factors ranked the highest, with entries having identical preference factors prioritized such that those with the fewest numbers of compute devices are ranked higher. As such, the method 400 may operate to evaluate the combinations of CI assets with any of a variety of weighting mechanisms that reflects user policies and other considerations described herein, which as discussed above may prefer least loaded CI assets (e.g., storage arrays) and thus may reduce the weight (preference factor) for combinations/subsets CI assets and/or other CI resources with higher loads.

Thus, systems and methods have been described that provide for the identification of workload performance and capacity requirements, followed by the automatic determination of CI assets in a bounded CI system that satisfy the workload performance and capacity requirements, which allows that workload to be performed using those CI assets. This may be accomplished by a CI/workload management system that receives a workload including workload requirements, determines a first storage array that is included in a plurality of storage arrays provided in a CI system and that satisfies at least one storage requirement included in the workload requirements, and determines a first subset of a plurality of server devices included in the CI system that have a path to the first storage array and that satisfy at least one compute requirement included in the workload requirements. The CI/workload management system may then identify the first subset of the server devices to a user of the CI system, and configure the first subset of the server devices and the first storage array to provide the workload. As such, an automated configuration of CI assets in a CI system for performing any particular workload is provided that eliminates the need to perform time consuming and error prone manual processes required for conventional CI systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A workload/Converged Infrastructure (CI) asset allocation system, comprising:
    a CI system having a plurality of CI assets that include:
    a plurality of compute devices including one or more processors; and
    a plurality of storage arrays; and
    a CI/workload management system that is coupled to the CI system and that is configured to:
    receive a workload that includes a plurality of workload requirements;
    determine a first storage array that is included in the plurality of storage arrays and that satisfies at least one storage requirement included in the plurality of workload requirements;
    determine a first subset of the plurality of compute devices that include a path to the first storage array and that satisfy at least one compute requirement included in the plurality of workload requirements;
    identify the first subset of the plurality of compute devices; and
    configure the first subset of the plurality of compute devices and the first storage array to provide the workload.

2. The system of claim 1, wherein the determining the first storage array that satisfies the at least one storage requirement includes:
    determining that the first storage array includes at least one storage attribute identified in the at least one storage requirement;
    determining that the first storage array includes a minimum storage capacity identified in the at least one storage requirement; and
    determining that the first storage array includes a plurality of first storage array storage controllers with a lower utilization relative to storage controllers included in the others of the plurality of storage arrays.

3. The system of claim 1, wherein the determining the first subset of compute devices that satisfies the at least one compute requirement includes:
    determining that the first subset of the plurality of compute devices includes a minimum processing capability identified in the at least one compute requirement; and
    determining that the first subset of the plurality of compute devices includes a minimum memory capacity identified in the at least one compute requirement.

4. The system of claim 1, wherein the CI/workload management system is configured to:
    determine that the first subset of the plurality of compute devices are each included in the same compute domain.

5. The system of claim 1, wherein the CI/workload management system is configured to:
    determine that the first subset of the plurality of compute devices includes a minimum number of compute devices needed to satisfy the at least one compute requirement.

6. The system of claim 1, wherein the CI/workload management system is configured to:
    determine that the first subset of the plurality of compute devices satisfies at least one compute device chassis balancing metric.

7. An Information Handling System (IHS), comprising:
    a processing system including one or more processors; and
    a memory system that is coupled to the processing system and that includes instructions that, when executed by the processing system, cause the processing system to provide a Converged Infrastructure (CD/workload management engine that is configured to:
    receive a workload that includes a plurality of workload requirements;
    determine a first storage array that is included in a plurality of storage arrays and that satisfies at least one storage requirement included in the plurality of workload requirements;
    determine a first subset of a plurality of compute devices that include a path to the first storage array and that satisfy at least one compute requirement included in the plurality of workload requirements;
    identify the first subset of the plurality of compute devices; and
    configure the first subset of the plurality of compute devices and the first storage array to provide the workload.

8. The IHS of claim 7, wherein the determining the first storage array that satisfies the at least one storage requirement includes:
    determining that the first storage array includes at least one storage attribute identified in the at least one storage requirement;
    determining that the first storage array includes a minimum storage capacity identified in the at least one storage requirement; and
    determining that the first storage array includes a plurality of first storage array storage controllers with a lower utilization relative to storage controllers included in the others of the plurality of storage arrays.

9. The IHS of claim 7, wherein the determining the first subset of compute devices that satisfies the at least one compute requirement includes:
    determining that the first subset of the plurality of compute devices includes a minimum processing capability identified in the at least one compute requirement; and determining that the first subset of the plurality of compute devices includes a minimum memory capacity identified in the at least one compute requirement.

10. The IHS of claim 7, wherein the CI/workload management engine is configured to:
determine that the first subset of the plurality of compute devices are each included in the same compute domain.

11. The IHS of claim 7, wherein the CI/workload management engine is configured to:
determine that the first subset of the plurality of compute devices includes a minimum number of compute devices needed to satisfy the at least one compute requirement.

12. The IHS of claim 7, wherein the CI/workload management engine is configured to:
determine that the first subset of the plurality of compute devices satisfies at least one compute device chassis balancing metric.

13. The IHS of claim 7, wherein the determining the first subset of the plurality of compute devices that satisfy the at least one compute requirement includes determining that the first subset of the plurality of compute devices includes a number of compute device cores included in the at least one compute requirement.

14. A method for allocating Converged Infrastructure (CI) asset to workloads, comprising:
receiving, by a Converged Infrastructure (CD/workload management system, a workload that includes a plurality of workload requirements;
determining, by the CI/workload management system, a first storage array that is included in a plurality of storage arrays and that satisfies at least one storage requirement included in the plurality of workload requirements;
determining, by the CI/workload management system, a first subset of a plurality of compute devices that include a path to the first storage array and that satisfy at least one compute requirement included in the plurality of workload requirements;
identifying, by the CI/workload management system, the first subset of the plurality of compute devices; and
configuring, by the CI/workload management system, the first subset of the plurality of compute devices and the first storage array to provide the workload.

15. The method of claim 14, wherein the determining the first storage array that satisfies the at least one storage requirement includes:
determining that the first storage array includes at least one storage attribute identified in the at least one storage requirement;
determining that the first storage array includes a minimum storage capacity identified in the at least one storage requirement; and
determining that the first storage array includes a plurality of first storage array storage controllers with a lower utilization relative to storage controllers included in the others of the plurality of storage arrays.

16. The method of claim 14, wherein the determining the first subset of compute devices that satisfies the at least one compute requirement includes:
determining that the first subset of the plurality of compute devices includes a minimum processing capability identified in the at least one compute requirement; and
determining that the first subset of the plurality of compute devices includes a minimum memory capacity identified in the at least one compute requirement.

17. The method of claim 14, further comprising:
determining, by the CI/workload management system, that the first subset of the plurality of compute devices are each included in the same compute domain.

18. The method of claim 14, further comprising:
determining, by the CI/workload management system, that the first subset of the plurality of compute devices includes a minimum number of compute devices needed to satisfy the at least one compute requirement.

19. The method of claim 14, further comprising:
determining, by the CI/workload management system, that the first subset of the plurality of compute devices satisfies at least one compute device chassis balancing metric.

20. The method of claim 14, wherein the determining the first subset of the plurality of compute devices that satisfy the at least one compute requirement includes determining that the first subset of the plurality of compute devices includes a number of compute device cores included in the at least one compute requirement.

* * * * *

UNITED STATES PATENT AND TRADEMARK OFFICE
CERTIFICATE OF CORRECTION

| | | |
|---|---|---|
| PATENT NO. | : 11,003,500 B2 | Page 1 of 1 |
| APPLICATION NO. | : 16/513205 | |
| DATED | : May 11, 2021 | |
| INVENTOR(S) | : Alan Raymond White | |

It is certified that error appears in the above-identified patent and that said Letters Patent is hereby corrected as shown below:

In the Claims

In Claim 7, Column 18, Line 32: please replace "(CD/" with --(CI)/--

In Claim 14, Column 19, Line 27: please replace "(CD/" with --(CI)/--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*